(12) United States Patent
Long et al.

(10) Patent No.: US 8,533,710 B1
(45) Date of Patent: Sep. 10, 2013

(54) USING OBSERVED THREAD ACTIVITY TO DYNAMICALLY TUNE A VIRTUAL MACHINE FOR RESPONSIVENESS

(75) Inventors: Dean R. E. Long, Boulder Creek, CA (US); Yin Zin Mark Lam, Milpitas, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1558 days.

(21) Appl. No.: 11/514,550

(22) Filed: Aug. 31, 2006

(51) Int. Cl.
  *G06F 9/455* (2006.01)
  *G06F 9/46* (2006.01)

(52) U.S. Cl.
  USPC .............................. 718/1; 718/103; 718/104

(58) Field of Classification Search
  None
  See application file for complete search history.

(56) References Cited

U.S. PATENT DOCUMENTS

| | | | | |
|---|---|---|---|---|
| 5,946,487 | A * | 8/1999 | Dangelo | 717/148 |
| 6,243,788 | B1 * | 6/2001 | Franke et al. | 711/3 |
| 6,351,808 | B1 * | 2/2002 | Joy et al. | 712/228 |
| 6,401,155 | B1 * | 6/2002 | Saville et al. | 710/266 |
| 6,404,506 | B1 * | 6/2002 | Cheng et al. | 356/634 |
| 6,779,182 | B1 * | 8/2004 | Zolnowsky | 718/103 |
| 6,910,213 | B1 * | 6/2005 | Hirono et al. | 718/108 |
| 7,577,951 | B2 * | 8/2009 | Partamian et al. | 718/1 |
| 2003/0037089 | A1 * | 2/2003 | Cota-Robles et al. | 709/1 |
| 2003/0204552 | A1 * | 10/2003 | Zuberi | 709/103 |
| 2004/0139441 | A1 * | 7/2004 | Kaburaki et al. | 718/107 |
| 2004/0216108 | A1 * | 10/2004 | Robbin | 718/100 |
| 2005/0160416 | A1 * | 7/2005 | Jamison | 717/154 |
| 2005/0160423 | A1 * | 7/2005 | Bantz et al. | 718/1 |
| 2005/0183084 | A1 * | 8/2005 | Cuomo et al. | 718/100 |
| 2006/0031658 | A1 * | 2/2006 | Swanberg et al. | 712/1 |
| 2006/0294522 | A1 * | 12/2006 | Havens | 718/103 |
| 2007/0074224 | A1 * | 3/2007 | Chen | 718/108 |
| 2009/0320048 | A1 * | 12/2009 | Watt et al. | 719/319 |

* cited by examiner

*Primary Examiner* — Meng An
*Assistant Examiner* — Tammy Lee
(74) *Attorney, Agent, or Firm* — Park, Vaughan, Fleming & Dowler, LLP; Mark D. Spiller

(57) ABSTRACT

One embodiment of the present invention provides a system that uses observed thread activity to dynamically tune a virtual machine for responsiveness and/or throughput. During operation, the system observes the activity of a thread to determine whether the thread needs responsiveness and/or throughput. Next, the system gathers statistics for the thread based on these observations of thread activity, and then uses these statistics to dynamically tune a virtual machine upon which the thread will execute.

18 Claims, 4 Drawing Sheets

USING OBSERVED THREAD ACTIVITY TO DYNAMICALLY TUNE A VIRTUAL MACHINE FOR RESPONSIVENESS

RELATED APPLICATION

The subject matter of this application is related to the subject matter in a co-pending non-provisional application by the same inventors as the instant application and filed on the same day as the instant application entitled, "Using Method-Profiling to Dynamically Tune a Virtual Machine for Responsiveness," having Ser. No. 11/514,513, and filing date Aug. 31, 2006. The subject matter of this application is also related to the subject matter in a co-pending non-provisional application by Antonios Printezis and Yin Zin Mark Lam filed on the same day as the instant application entitled, "Using Observed Object Patterns to Dynamically Tune a Virtual Machine for Responsiveness," having Ser. No. 11/514,514, and filing date Aug. 31, 2006.

BACKGROUND

1. Field of the Invention

The present invention generally relates to techniques for improving performance in computer systems. More specifically, the present invention relates to a system and a method for automatically determining responsiveness and/or throughput requirements at runtime to enable dynamic tuning of a virtual machine to adapt to usage conditions.

2. Related Art

The Java™ environment has become a very popular software platform for memory-constrained devices, such as wireless devices. For example, Motorola, Nokia, NTT DoCoMo, RIM, Siemens, and many other key players in the wireless device industry have shipped a large number of Java-enabled devices. In fact, hundreds of millions of Java-enabled mobile phones have been shipped during the past few years.

The Java™ environment provides a virtual machine, which presents a standard virtual environment for different device platforms that allows applications to be written once and then run on a variety of devices, including wireless devices as well as desktop and server computers. The performance of virtual machine (VM) implementations can typically be tuned to be either responsive, with low latency, or to provide high-throughput. Since responsiveness and high-throughput are seldom complementary, virtual machines often allow designers and/or users to specify implementation parameters that affect the tradeoff between responsiveness and throughput in the virtual machine implementation. However, virtual machine technology is quite complex, and consequently this tuning may involve an iterative, interactive process. In addition, because new applications are often dynamically loaded and introduced into the system after initial system deployment, and because application needs are dynamic in nature, most users opt to not tune the system, which results in less-than-optimal performance.

Hence, what is needed is a system and a method for automatically determining responsiveness and/or throughput requirements at runtime to enable dynamic tuning of a virtual machine to adapt to usage conditions.

SUMMARY

One embodiment of the present invention provides a system that uses observed thread activity to dynamically tune a virtual machine for responsiveness and/or throughput. During operation, the system observes the activity of a thread to determine whether the thread needs responsiveness and/or throughput. Next, the system gathers statistics for the thread based on these observations of thread activity, and then uses these statistics to dynamically tune a virtual machine upon which the thread will execute.

In a variation on this embodiment, the system identifies the priority of the thread while observing the activity of the thread. The system categorizes a high thread priority as a thread needing responsiveness.

In a further variation, the system gathers statistics by tracking a set of access patterns for threads. For instance, the system can track the frequency of context switches for high-priority threads as well as the interval between the execution of high-priority threads.

In a variation on this embodiment, the system maintains a set of measured values that correspond to levels of responsiveness and/or throughput. These measured values can include statistics collected by the instrumentation or sampling as well as a pre-specified set of values that the statistics are compared against to determine whether the system needs to be tuned for responsiveness or throughput. The system translates these measured values into a set of configuration parameters for the virtual machine. The system can also decay these collected measured values over time to ensure that the virtual machine is tuned based on recent behavior.

In a variation on this embodiment, the system observes inter-thread synchronization mechanisms while observing thread activity. Inter-thread synchronization mechanisms include, but are not limited to, notify-wait operations and locking mechanisms.

In a variation on this embodiment, the system dynamically tunes the virtual machine by dynamically changing virtual machine behavior or priorities. Changing virtual machine behavior can involve dynamically changing and/or re-configuring virtual machine runtime components. For instance, the system can tune the virtual machine by dynamically changing and/or re-configuring a garbage-collector, a just-in-time compiler, a thread-synchronization system, and/or other VM runtime components.

In a variation on this embodiment, the system observes thread activity using an instrumented system scheduler that observes thread activity by tracking priorities when threads are switched. Tracking these priorities assists the system in determining the responsiveness needed by a thread.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Tuning Virtual Machines

Figure 1:
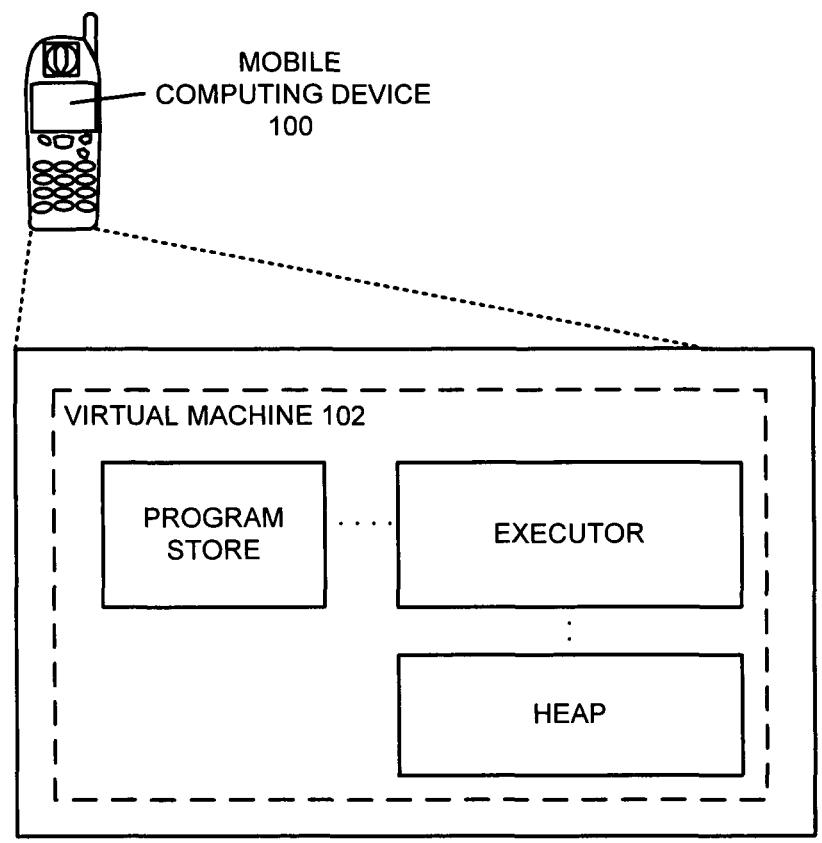
FIG. 1 illustrates a mobile computing device that includes a virtual machine in accordance with an embodiment of the present invention.

FIG. 1 illustrates a mobile computing device 100 that includes a virtual machine 102. As mentioned previously, virtual machine (VM) implementations can be tuned to be either responsive, with low latency, or to provide high-throughput performance, depending on the nature of an application. Some applications, such as graphical-user-interfaces (GUIs), involve substantial user interaction, and therefore need a responsive VM with low latency. Other applications, such as scientific computing, involve less or no user interaction but process large amounts of data, and hence prefer a VM with higher throughput. Moreover, some applications, such as web servers, desire both high throughput and high responsiveness. However, responsiveness and high-throughput are seldom complementary, especially in garbage-collected systems, since a system tuned to be responsive tends to yield lower throughput, and a system tuned for high throughput tends to be less responsive.

Some VM implementations allow various runtime options to be specified which affect responsiveness and throughput. For example, in the Java™ VM, the "-Xms" and "-Xmx" options can be used at VM launch time to specify the size of the heap. Some systems can also be configured to choose an efficient, high-throughput "server mode" or a more responsive "client mode" at VM launch time based on device configuration (e.g., single or multiple processors, available memory, type of hardware, etc.). Other examples of VM options can involve selecting the type and parameters of a garbage collector and the size of compiled code caches. For instance, a garbage collector might be configured to make frequent, small collections in bursts, to be less interruptive, or to perform longer, more-efficient runs at longer intervals. Alternatively, in addition to configuring a garbage collector to use shorter or longer intervals, a system may respond to such configuration parameters by choosing a different garbage collector that has a higher likelihood of achieving the desired behavior and/or performance.

Other examples of VM components that can be tuned include the just-in-time compiler, the thread-synchronization system, and other VM runtime components. The just-in-time compiler can be tuned to either provide simpler compilation, so as to shorten the amount of interruption to normal application execution due to compilation time, or it may be tuned to generate the most-optimal code for better throughput (but at the cost of longer compilation time). The thread-synchronization system may be tuned to determine which types of synchronization algorithms will be used and how aggressively synchronization data structures will be allocated and reclaimed. Other VM runtime components can be similarly tuned to employ different algorithms that favor either responsiveness or throughput.

Note that the term "just-in-time (JIT) compiler" is used in the context of the instant application to generally refer to any runtime compiler technology in virtual machines including, but not limited to, dynamic adaptive compilers, ahead-of-time compilers, install/load-time compilers, and runtime linkers.

While such tuning options allow system designers or users to hand-tune a VM, tuning such parameters often involves a time-consuming, interactive process, and may require a deep understanding of the underlying implementation of the VM and the operating system. Note also that VM-tuning is typically at least partially application-dependent. Since application code is often dynamically loaded and introduced into the system after deployment, the tuner may not have access to the application at the time of tuning. Furthermore, many applications are dynamic in nature, and an application's latency requirements may change depending on input and runtime circumstances, for instance in an application that first interactively gathers input data and then switches to a non-interactive data processing state. The gathering of input data typically requires higher responsiveness from the VM, while non-interactive data processing typically requires higher throughput. Hence, in order to attain optimum performance, the VM needs to be tuned differently at different phases of an application's life cycle. Therefore, it is not possible to attain a static set of tuning options that is optimal for the entire life cycle of the application. As a result of tuning difficulty, many devices use un-tuned or approximately-tuned VMs with less-than-optimal performance.

One embodiment of the present invention provides techniques to gather statistics and detect the desired responsiveness and/or throughput of applications. These statistics allow the VM to dynamically self-tune and adapt to perform at close to an optimal level based on the needs of the applications, without requiring intervention from a user. Note that these techniques can be applied to a wide range of software platforms in devices that include wireless devices, desktop computers, and servers.

Method Instrumentation

The term "interactive" is used in the context of the instant application to describe artifacts in a VM (e.g. methods, objects, and fields) that are associated with work that typically requires greater responsiveness. Responsiveness indicates how quickly a system responds to a request. For instance, responsiveness can be measured by the time interval needed to generate a response to an action or query, such as a user input. A system that takes 50 ms to update a display in response to a user key press is considered more responsive than a system that takes several seconds to respond. The term "throughput" is used in the context of the instant application to describe artifacts in a VM that are associated with work that typically requires greater throughput. Throughput can be measured as the amount of work done by a system in a given period of time, with higher throughput sometimes coming at the cost of lower responsiveness. For example, a system that can process 100 queries per second has higher throughput than a system that can process only 50 queries of the same type per second. Note that a system can typically optimize for either a higher level of responsiveness or a higher level of throughput, but can seldom achieve both at the same time. For example, a system that optimizes for responsiveness will tend to be structured to perform work in small units to ensure that no one unit of work ties up the CPU for too long, thereby allowing a timely response to interactive events such as user inputs. Alternatively, a system that optimizes for throughput will tend to be structured to perform work in large units in order to minimize the cumulative initialization and clean up overhead for each unit of work. Hence, attempts to optimize for both responsiveness and throughput are typically not complementary, and may actually be at odds with each other.

Existing VM technologies can achieve either high throughput or high responsiveness, but involve parameterization specified by a human operator of the VM. One embodiment of the present invention instruments methods to collect statistics on the frequency with which the methods are invoked. For instance, in a GUI application, a user may interact with the application continuously by entering data via a keyboard, moving a pointer device, pushing buttons, or using some other input device. When such inputs occur, the VM typically invokes a set of methods to process the input, for instance by invoking constructors for event objects, event-distribution methods, or event-processing methods. By instrumenting and collecting statistics for some or all of these methods, the system can infer the level of responsiveness needed for the currently-executing application.

Figure 2:
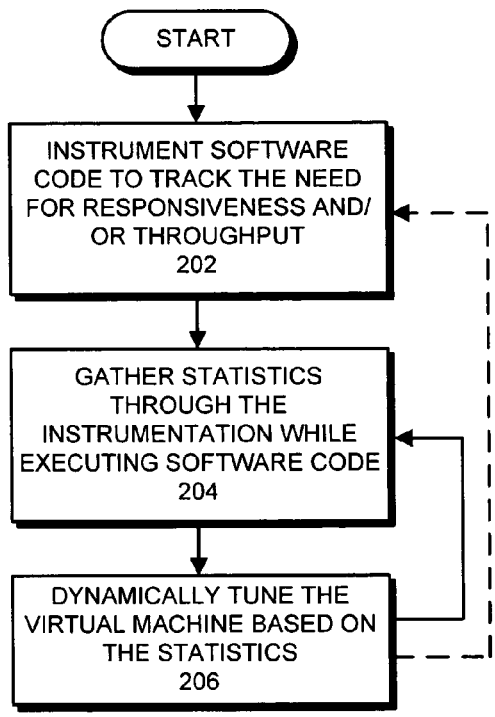
FIG. 2 presents a flow chart illustrating the process of instrumenting methods to tune a virtual machine in accordance with an embodiment of the present invention.

FIG. 2 presents a flow chart illustrating the process of instrumenting methods to tune a virtual machine. First, the system instruments software code, such as the source code for a set of standard input/output libraries, to track the need for responsiveness and/or throughput (step 202). The system then gathers statistics through the instrumentation while executing the software code (step 204). Next, the system dynamically tunes the virtual machine based on the statistics (step 206). Note that the system remains dynamic and active, and continues to gather statistics and tune the VM for the current needs of applications. Hence, step 204 and step 206 can be subsequently repeated to detect changes in the need for responsiveness and/or throughput. The system may also optionally repeat step 202 as additional or alternative methods are instrumented to gather ongoing statistics.

In one embodiment of the present invention, some or all of the software code instrumentation may be added manually by a programmer at development time. Alternatively the system may automatically insert software code instrumented by a system designer and/or user, or perform a mix of insertions and automated instrumentation.

In one embodiment of the present invention, an event-constructor method increments a global counter that represents the present need for responsiveness. Methods that increment this counter could include input methods that handle keyboard, mouse, or other input methods such as network socket connections, as well as in output methods related to screen refreshes, rendering of GUI objects, or an event handling/distribution system. A system designer could also specifically designate methods as being likely to need high responsiveness or high throughput.

A higher value of the global counter typically corresponds to an application with a need for more responsiveness. The VM periodically inspects the collected statistics from the instrumented methods to determine the level of responsiveness needed by the present set of applications. In a further embodiment, the system also decays the values of the collected responsiveness measurements. For instance, the system can decay these values during every garbage collection cycle, or at a periodic wake-up of a timer thread. Alternatively, the system can also instrument non-interactive methods to decrement the counter. While the system may conditionally increment the counter for interactive methods (and/or thread activity and object observations, as described in the following sections), counter decay is typically non-conditional, and often also non-linear. Note that in many situations measurement values can be viewed more as "hints," and therefore do not need precise techniques such as locking mechanisms, which involve higher overhead and complexity. Note also that detecting objects needing responsiveness may result in a non-linear change in virtual machine behavior; detecting even a small proportion of interactive artifacts, such as invocations of interactive methods and/or the presence of interactive objects and thread activity (as described in the following sections), may result in tuning a virtual machine towards high responsiveness.

A periodic inspection mechanism can also serve to propagate the computed responsiveness measurement(s) to the VM and any other relevant subsystems for tuning. This process may involve translating the responsiveness measurement(s) into parameter values for the VM and other subsystems. Translation methods include, but are not limited to, executing formulaic computations for each parameter value, applying heuristic logic, using tabular lookup, and/or using artificial intelligence decision engines such as neural networks or fuzzy logic.

Over time, if many instrumented methods are triggered during an inspection interval, the system detects from the measured responsiveness values a need for higher responsiveness. Conversely, if only a small number of instrumented methods are triggered in an interval, the measured value tends to be lower, indicating a lower need for responsiveness that may lead to the system tuning itself for throughput.

In one embodiment of the present invention, the method instrumentation may be optimized to reduce the pervasiveness of instrumentation and thereby limit the cost of executing instrumented code to the most-relevant cases. For instance, instrumentation may be performed in just-in-time (JIT) compiled code. Since a JIT compiler typically only compiles frequently-executed code, only the relevant methods in the JIT compiler's frequently-executed set are instrumented. By not instrumenting methods outside this set, the system can save processing time that would otherwise be spent instrumenting infrequently-executed methods or executing the instrumentation in infrequently-executed methods, as well as additional code space to store the instrumented code.

Figure 3:
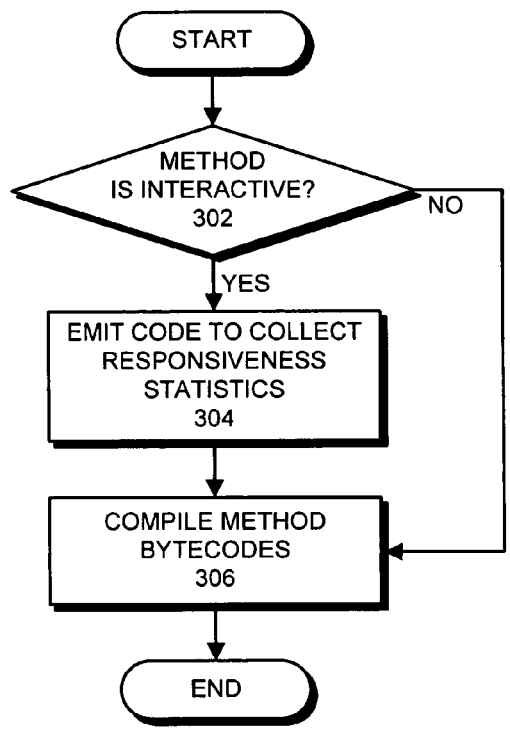
FIG. 3 presents a flow chart illustrating the process of instrumenting methods during just-in-time compilation in accordance with an embodiment of the present invention.

FIG. 3 presents a flow chart illustrating the process of instrumenting methods during just-in-time compilation. When compiling a method, the system first checks whether the method is interactive (step 302). If so, the system emits code to collect responsiveness statistics (step 304) before proceeding with the standard process of compiling the method bytecodes (step 306).

Another embodiment of method instrumentation uses sampling-based profiling to gather statistics on the invocation of methods with a responsive nature. For instance, a periodically-executed sampling thread can inspect the runtime stack of currently-executing threads in the VM to collect statistics on how many methods of a high-responsiveness nature are currently being executed. Alternatively, the sampling thread can also look for sequences of method invocations, or traces, on the thread runtime stacks, to determine from the proportion of traces representing highly-responsive work the need for VM responsiveness. Note that any approach for method or trace profiling may be applied to determining responsiveness requirements when the profiling is used to collect statistics about interactive or non-interactive methods.

Thread Tracking

In one embodiment of the present invention, the system observes thread activity to gather statistics that can be used to tune the VM. Real-time applications that are multi-threaded or multi-tasking tend to have different priorities for their threads (where the term thread can be used to describe threads, tasks, or any abstraction representing a multi-tasking unit of execution). In real-time applications expecting responsiveness, threads that need more responsiveness tend to be assigned higher priorities, so that they can execute in a more-timely manner. However, in a dynamic virtual machine, such as a Java™ virtual machine, thread priorities alone may not be sufficient to ensure the responsiveness of the thread, because other system components such as a "stop-the-world" garbage collector may pause all threads during operation. Once such an event occurs, the best system response in conventional real-time systems is to boost the priority of the thread performing the garbage collection operation to let it complete as quickly as possible, and thereafter allow blocked high-priority threads to run. However, boosting the priority of the garbage collection thread does not provide any benefit in this situation, since all other threads are paused and unable to preempt the garbage collector at this point. The present invention allows the system to detect the need for responsiveness ahead of time and configure the garbage collector to achieve responsiveness rather than simply relying on thread-priority boosting alone.

The system can determine whether a currently-executing application needs high responsiveness by observing thread context switches. Frequent context switches between threads of different priorities that occur on a frequent basis typically imply that there are some threads in the system that need to respond in a timely manner to certain events (i.e. need high responsiveness). The system can track the access patterns for a set of threads, for instance by tracking the frequency of context switches involving high-priority threads and the interval between the execution of high-priority threads (where a shorter interval indicates a higher need for responsiveness). Such information can be used to tune the VM, for instance to execute garbage collection with lower pause times that do not interfere with the responsiveness of the real-time thread. Alternatively, the system can also use detected patterns to schedule jobs such as garbage collection during intervals in which a low need for responsiveness is expected.

Figure 4:
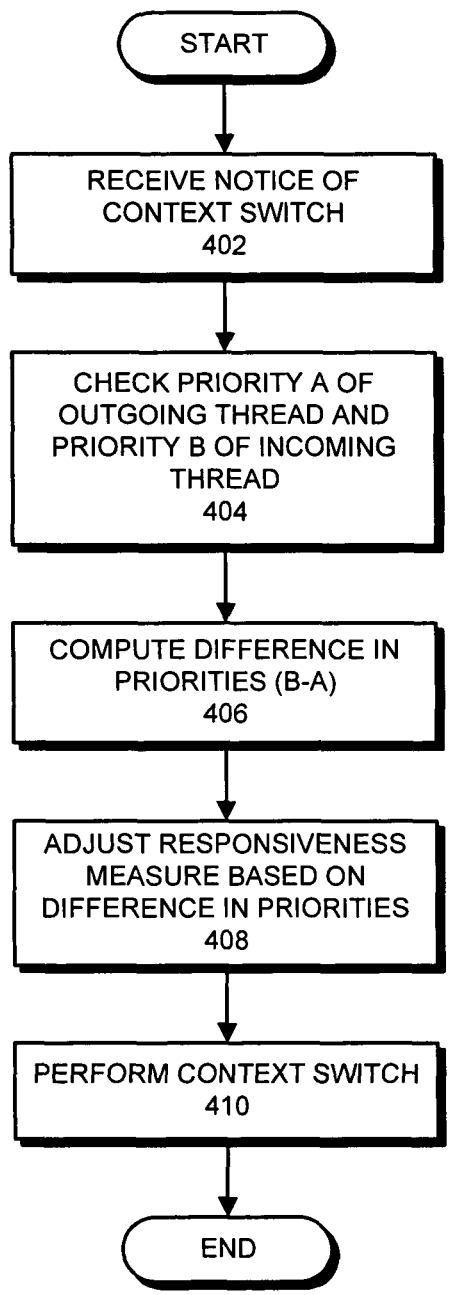
FIG. 4 presents a flow chart illustrating the process of gathering statistics during a thread context switch in accordance with an embodiment of the present invention.

FIG. 4 presents a flow chart illustrating the process of gathering statistics during a thread context switch. At the time of a context switch (step 402), the system checks the priority A of an outgoing thread and the priority B of an incoming thread (step 404). The system computes the difference between B and A (step 406), and then uses this difference in priorities to adjust the responsiveness measure of the VM (step 408). After this, the system proceeds with the context switch (step 410).

In one embodiment of the present invention, the VM infers a higher need for responsiveness from the number of threads created with different priorities. An application that creates threads with different priorities typically implies a need for high responsiveness, while an application that creates threads with substantially similar priorities typically needs less responsiveness.

A VM can also observe thread activity based on inter-thread synchronization mechanisms, sometimes in the context of specific objects. For instance, a high rate of notify-wait operations on object types that are associated with interactive work, such as GUI event queues, often implies a need for high responsiveness. The system can also observe lock contentions, another example of inter-thread synchronization. A high contention rate between threads with different priorities typically implies the presence of threads servicing real-time events, hence indicating a need for high responsiveness. Many VMs include lightweight lock implementations in which contention results in lock inflation. Such VMs can instrument the lock inflation mechanism to check the difference in priority between the thread owning the lock and the thread contending for the lock. The lock operations of an inflated heavy-weight lock mechanism can also be modified to check for a difference in thread priority.

While the previous paragraphs describe observing threads in real-time applications and tuning garbage collection pause times, embodiments of the present invention also apply to non-real-time systems that include a need for responsiveness and to the tuning of other VM system components besides garbage collection that may also interfere with responsiveness. System designers often use different threads, with different priorities, as a way to provide abstraction or separation between different application functions.

Note that instrumenting a system to observe thread activity may involve modifying a system scheduler and need support from operating system assistance or application programmer interfaces. Some of the techniques mentioned may automatically detect and adapt to the level of support provided by the operating system. In addition to the garbage collector, the system may tune other sub-systems such as the just-in-time compiler, the thread-synchronization system, and other VM runtime components.

Observing Objects

In one embodiment of the present invention, the system observes the object population to gather statistics that can be used to tune the VM. Applications that need responsiveness, such as GUI applications, tend to instantiate objects, such as GUI event objects, which represent user input information. By observing the population of objects being instantiated, a VM can determine whether an executing application needs a high level of responsiveness.

Important factors for object observation include the extent, interval, and overhead of the object scan. One approach instruments methods in which objects are allocated to count the instantiation of objects that are artifacts of high responsiveness or high throughput. Alternatively, the system can observe objects by periodically scanning a memory region such as a heap or the young generation in the heap of a generational garbage collector system. For instance, the system can scan the memory region during a garbage collection cycle to gather statistics based on object type, object age, object movement (between generations in the heap, for instance), and object importance. This scan identifies event objects and other objects that indicate high responsiveness to determine whether high responsiveness or high throughput is currently needed.

Depending on the system, threads may allocate space to objects from a single shared heap, from the young generation of a generational shared heap, or from a thread allocation buffer exclusively allocated to the thread by the system. These thread allocation buffers provide a scalability optimization that enables threads to allocate memory without having to synchronize with the rest of the threads in the system at every allocation point. Instead, the threads synchronize only when a thread needs a new allocation buffer, thereby making most allocations synchronization-free. Thread allocation buffers are typically allocated from the young generation in a generational shared heap. This young generation is typically sized to provide enough of a time buffer that transient objects age and die away, thereby avoiding the cost of copying short-lived objects to an older generation. Insufficient remaining space in the allocation region and/or the young generation typically results in a request for a new allocation buffer and/or additional memory space, and can lead to an operation such as garbage collection. In one embodiment of the present invention, such a request provides an interrupt during which object observation can occur.

In a further embodiment, changing the perceived size of the memory allocation region, the young generation, or the entire heap can provide a way to tune an observation interval without adding overhead to normal object-allocation operations. For instance, although one thousand memory slots may be allocated and tracked in a memory region, the system may initially create an "artificial limit" of one hundred slots. When this artificial limit is reached, an interrupt is generated, the system performs any desired observation operations, and the artificial limit can be updated to a higher value (e.g. two hundred slots). In this case, additional memory would not need to be allocated from the heap, since slots are still available from the original allocation of one thousand slots. Note that the value for the artificial limit can be adjusted to adjust the observation interval, and that the original system behavior can also be achieved simply by setting the artificial limit to one thousand.

Because a full walk of a memory region may be overly expensive, and analyzing only objects promoted from a younger generation to an older generation often misses event objects, which are often typically transient, a reasonable lower-overhead solution may involve selective sampling of objects in a memory region. As mentioned previously, detecting even a small proportion or number of interactive objects, especially objects such as keyboard or mouse events that indicate user action, may result in a non-linear increase in tuning for responsiveness. Note also that some types of interactive or responsive actions may involve a combination of objects.

Figure 5:
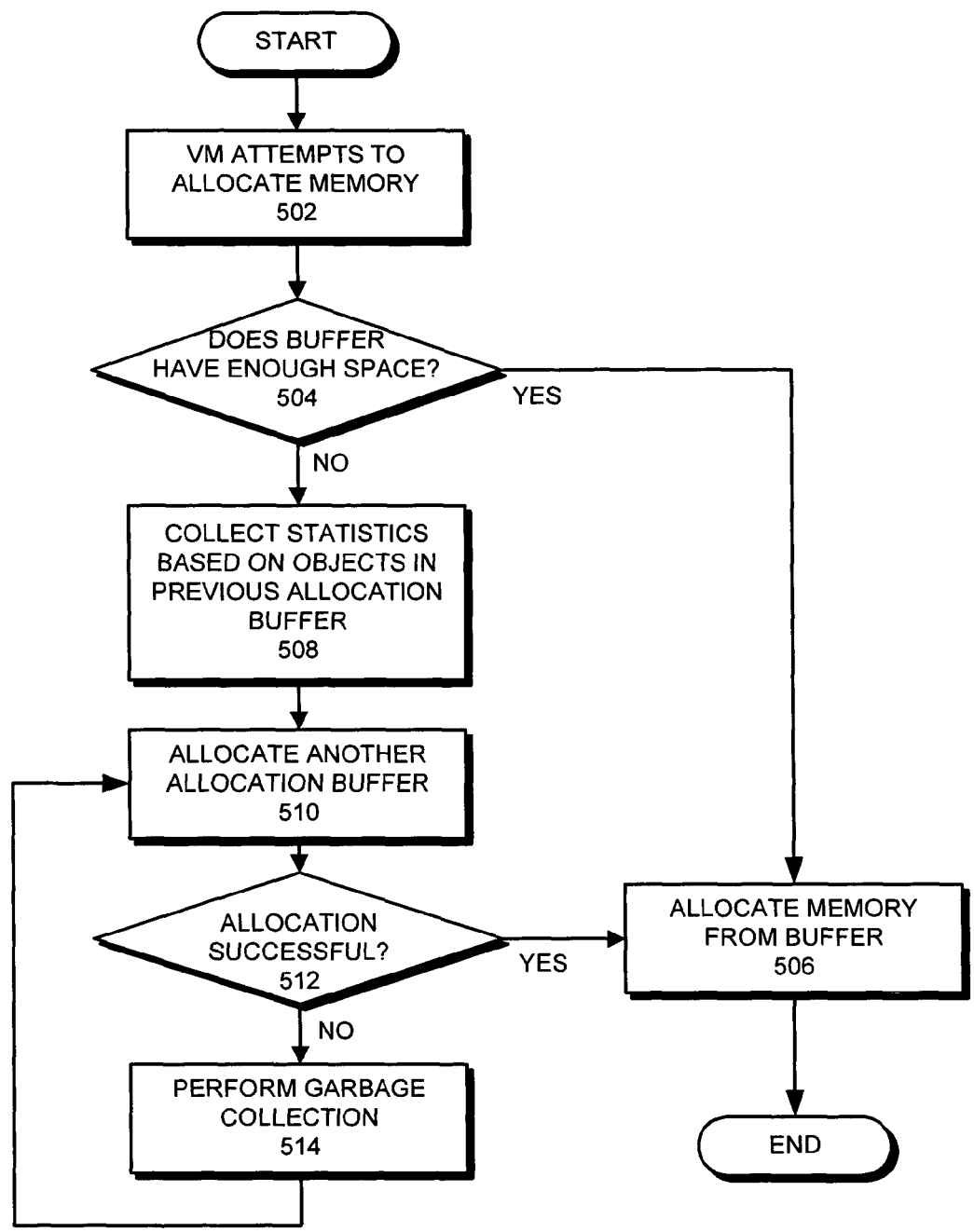
FIG. 5 presents a flow chart illustrating the process of allocating an object in memory in accordance with an embodiment of the present invention.

FIG. 5 presents a flow chart illustrating the process of allocating an object in memory. First, a VM attempts to allocate memory (step 502). For instance, if the system uses thread allocation buffers, the system may check whether the buffer has sufficient space available. If the buffer has enough space (step 504), the system allocates memory for the object from the buffer (step 506), and the operation completes. If sufficient space is not available in the buffer, the system may collect statistics based on objects in the previous allocation buffer (step 508), for instance by walking the buffer or performing sampling, and then attempt to allocate another allocation buffer (step 510). If this allocation succeeds (step 512), the system allocates memory for the object from the buffer (step 506), and the operation completes. If the allocation fails, the system requests a garbage collection operation (step 514) and then re-attempts to allocate another allocation buffer (step 510). Successive failures to allocate an additional allocation buffer after performing a garbage collection operation may prompt an out-of-memory error.

Marker Interfaces

In one embodiment of the present invention, "marker interfaces" provide a way for a VM to identify objects of a responsive nature. An interface is an abstract type that the class or types of the objects in the system may inherit from or implement. A marker interface is an interface that serves primarily to mark or decorate an object class or type. Through introspection or reflection mechanisms, the VM may inquire as to whether an object class or type implements a given interface or not. If the object class or type implements a specific marker interface, then the VM will observe this relationship. Hence, the object class or type is said to have been marked with the marker interface.

Marker interfaces can be used to decorate object types of interest, and provide a way for an application writer to provide hints to the VM about the responsive or high-throughput nature of objects. Such an interface might include no implemented methods; classes of an artifact object simply declare that the object implements the marker interface. The VM can gather statistics for whether objects in use implement this interface or not, and use these statistics to tune VM operations.

While the use of marker interfaces may be inappropriate for system classes because adding an interface may change published system APIs governed by standards processes, such techniques can be used by tightly-integrated "system applications" (such as file or task managers), middleware software stacks, or application programs to inform and tune the VM. An additional benefit is that such techniques allow responsiveness determination to be specified after VM deployment, thereby providing a way to give hints about object needs to the VM without needing prior knowledge of the object in the VM.

Alternate Marker Mechanisms

In one embodiment of the present invention, a VM may employ other mechanisms including, but not limited to, a published API, command-line arguments, a configuration file, or runtime configuration options to allow the user to identify objects of a responsive nature. These mechanisms may be used in place of or in conjunction with marker interfaces. One advantage of such mechanisms is that they do not change the published APIs of classes, and hence can be applied to system classes whose APIs are governed by standards processes.

Read/Write Barriers on Object Fields

In one embodiment of the present invention, a VM watches read/write activity on an object, or on specific fields of an object, to determine a need for responsiveness and/or throughput. The system employs read/write barriers that are triggered whenever a read or write to an object occurs. During such barriers, the VM determines how often fields related to the objects are touched or referenced and records statistics on the access patterns that can be used for VM tuning.

The system can instrument barriers for a small set of objects, such as objects related to input/output methods and objects in the system with single instances, such as the GUI event loop. An implementation of such barriers may include optimizations whereby only relevant field accesses trigger object sampling and/or statistic gathering, and non-relevant field accesses do not incur the cost of a barrier. In one embodiment, the system allocates objects of interest from a region of memory protected by special VM mechanisms that can be set up to selectively trigger a trap upon access, thereby providing a barrier during which the system can gather statistics.

Additional optimizations may include, but are not limited to, byte-code quickening, byte-code instrumentation, and compiler- or JIT-compiler-generated instruction instrumentations that implement barriers for detecting access to object-fields (and/or methods, and thread-synchronization mechanisms, as described in earlier sections) associated with a high-responsiveness or high-throughput nature. Bytecode quickening refers to a technique for re-writing interpreted bytecode at runtime, for instance to re-write offsets in bytecode as direct memory accesses and thereby improve code efficiency and accelerate execution. The system can add additional bytecode during the quickening process to indicate that a barrier should be emitted. Some VMs may even include private bytecode instructions for barriers, which can be inserted during bytecode quickening or instrumentation.

In summary, the present invention describes techniques to gather statistics and detect the desired responsiveness and/or throughput of applications. These statistics allow the VM to dynamically self-tune and adapt to perform optimally at all times based on the needs of the applications, without requiring intervention from a user. Note that a variety of these techniques can be implemented cooperatively to more accurately detect a need for responsiveness and/or throughput. Note also that the present invention can provide input to any number of tuning parameters that can affect the performance of a VM, including tuning options not yet known.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for using observed thread activity to dynamically tune a virtual machine for responsiveness or throughput, comprising:
   in a computer system, performing the operations of:
   observing the activity of a thread in a set of threads to determine whether the thread needs at least one of responsiveness or throughput, wherein observing the activity of a thread involves identifying a priority for the thread, wherein if the thread is a high-priority thread, the thread is categorized as needing responsiveness;
   gathering statistics for the thread from the observations of thread activity to determine a level of responsiveness needed by the thread, wherein gathering the statistics comprises tracking at least one of frequency of context switches of high-priority threads and intervals between the execution of high-priority threads, and maintaining a set of measured values corresponding to the level of responsiveness, the measured values being decayed over time to ensure that the measured values reflect recent behavior; and
   dynamically tuning a virtual machine upon which the thread will execute based on the gathered statistics and the level of responsiveness.

2. The method of claim 1, wherein gathering the statistics for the thread involves:
   translating the set of measured values into a set of configuration parameters for the virtual machine.

3. The method of claim 1,
   wherein dynamically tuning a virtual machine involves dynamically changing or re-configuring virtual machine behavior or priorities; and
   wherein dynamically changing or re-configuring virtual machine behavior can involve dynamically changing or re-configuring virtual machine runtime components including:
   a garbage-collector;
   a just-in-time compiler; and/or
   a thread-synchronization system.

4. The method of claim 1,
   wherein observing the activity of the thread involves instrumenting a system scheduler to track priorities when switching threads; and
   wherein tracking priorities assists in determining the responsiveness needed by the thread.

5. The method of claim 1, wherein gathering the statistics further comprises observing a population of objects being instantiated.

6. The method of claim 1,
   wherein gathering statistics involves tracking a set of access patterns for the set of threads; and
   wherein tracking the set of access patterns includes tracking a frequency of context switches of high-priority threads and an interval between the execution of high-priority threads.

7. The method of claim 1,
   wherein observing the activity of the thread includes observing inter-thread synchronization mechanisms; and
   wherein inter-thread synchronization mechanisms include notify-wait operations and locking mechanisms.

8. A non-transitory computer-readable storage medium storing instructions that when executed by a computer cause the computer to perform a method for using observed thread activity to dynamically tune a virtual machine for responsiveness or throughput, the method comprising:
   observing the activity of a thread in a set of threads to determine whether the thread needs at least one of responsiveness or throughput, wherein observing the activity of a thread involves identifying a priority for the thread, wherein if the thread is a high-priority thread, the thread is categorized as needing responsiveness;
   gathering statistics for the thread from the observations of thread activity to determine a level of responsiveness needed by the thread, wherein gathering the statistics comprises tracking at least one of frequency of context switches of high-priority threads and intervals between the execution of high-priority threads, and maintaining a set of measured values corresponding to the level of responsiveness, the measured values being decayed over time to ensure that the measured values reflect recent behavior; and
   dynamically tuning a virtual machine upon which the thread will execute based on the gathered statistics and the level of responsiveness.

9. The non-transitory computer-readable storage medium of claim 8, wherein gathering the statistics for the thread involves:
   translating the set of measured values into a set of configuration parameters for the virtual machine.

10. The non-transitory computer-readable storage medium of claim 8,
    wherein dynamically tuning a virtual machine involves dynamically changing or re-configuring virtual machine behavior or priorities; and
    wherein dynamically changing or re-configuring virtual machine behavior can involve dynamically changing or reconfiguring virtual machine runtime components including:
    a garbage-collector;
    a just-in-time compiler; and/or
    a thread-synchronization system.

11. The non-transitory computer-readable storage medium of claim 8, wherein observing the activity of the thread involves instrumenting a system scheduler to track priorities when switching threads; and
    wherein tracking priorities assists in determining the responsiveness needed by the thread.

12. The non-transitory computer-readable storage medium of claim 8,
    wherein gathering statistics involves tracking a set of access patterns for the set of threads; and
    wherein tracking the set of access patterns includes tracking a frequency of context switches of high-priority threads and an interval between the execution of high-priority threads.

13. The non-transitory computer-readable storage medium of claim 8, wherein observing the activity of the thread includes observing inter-thread synchronization mechanisms; and wherein inter-thread synchronization mechanisms include notify-wait operations and locking mechanisms.

14. A computing device that includes a processor that uses observed thread activity to dynamically tune a virtual machine for responsiveness and/or throughput, wherein the processor comprises:
- an observation mechanism that observes the activity of a thread in a set of threads to determine whether the thread needs at least one of responsiveness or throughput, wherein the observation mechanism is further configured to identify a priority for the thread, and wherein if the thread is identified as a high-priority thread, the thread is categorized as needing responsiveness;
- a gathering mechanism that gathers statistics for the thread from the observations of thread activity to determine a level of responsiveness needed by the thread, wherein gathering the statistics comprises tracking a set of access patterns comprises tracking at least one of frequency of context switches of high-priority threads and intervals between the execution of high-priority threads, and maintaining a set of measured values corresponding to the level of responsiveness, the measured values being decayed over time to ensure that the measured values reflect recent behavior; and
- a tuning mechanism configured to dynamically tune a virtual machine upon which the thread will execute based on the gathered statistics and the level of responsiveness.

15. The apparatus of claim 14,
wherein the gathering mechanism is further configured to translate the set of measured values into a set of configuration parameters for the virtual machine.

16. The apparatus of claim 14,
wherein the tuning mechanism is further configured to dynamically change or re-configure virtual machine behavior or priorities; and wherein dynamically changing or re-configuring virtual machine behavior can involve dynamically changing or re-configuring virtual machine runtime components including:
- a garbage-collector;
- a just-in-time compiler; and/or
- a thread-synchronization system.

17. The apparatus of claim 14,
wherein the gathering mechanism is further configured to track a set of access patterns for the set of threads, and wherein tracking the set of access patterns includes tracking a frequency of context switches of high-priority threads and an interval between the execution of high-priority threads.

18. The apparatus of claim 14,
wherein the observation mechanism is further configured to observe inter-thread synchronization mechanisms; and wherein inter-thread synchronization mechanisms include notify-wait operations and locking mechanisms.

* * * * *